Sept. 12, 1967 J. C. SMELTZER 3,341,817
MEMORY TRANSFER APPARATUS
Filed June 12, 1964
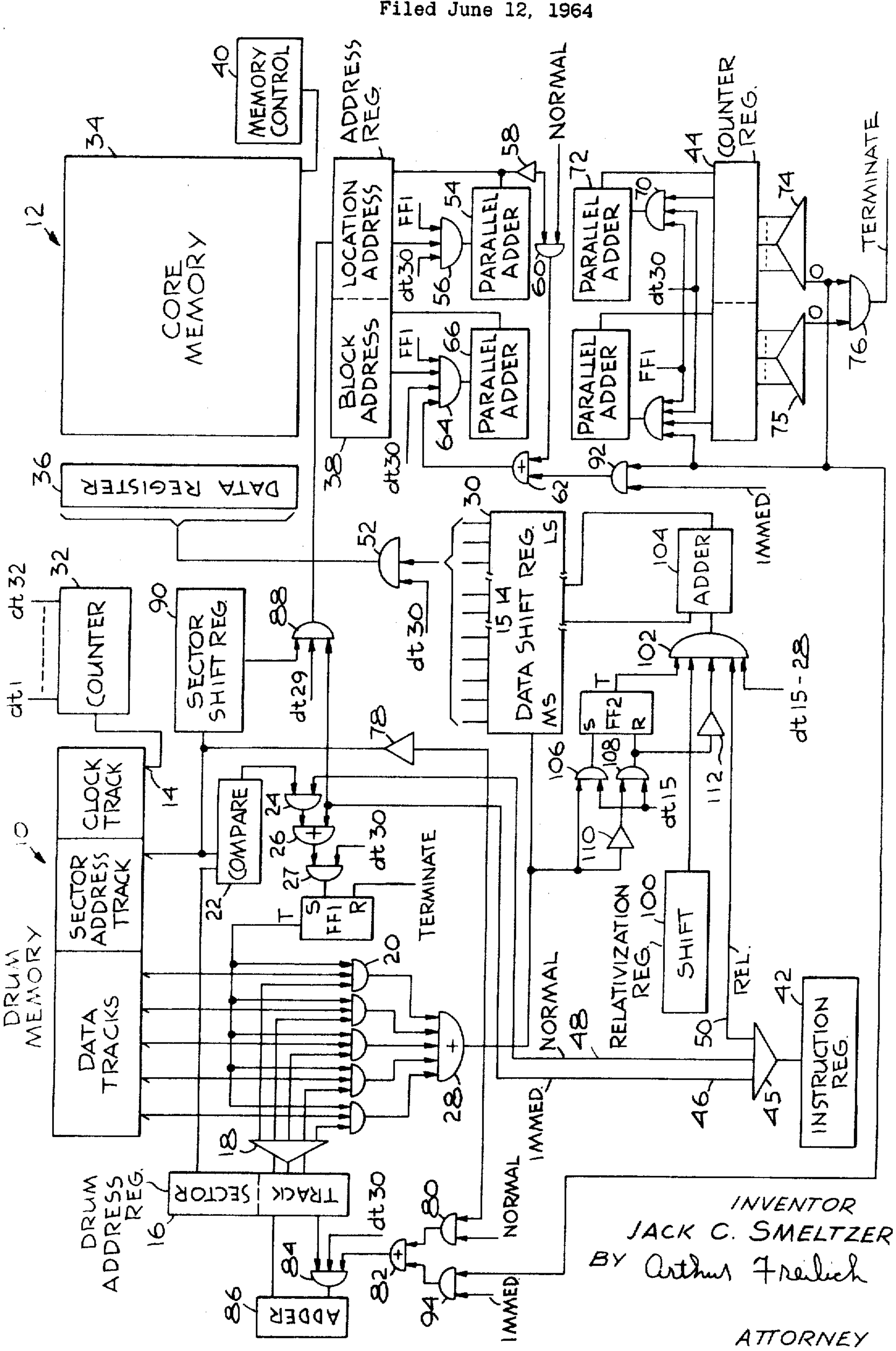
INVENTOR
JACK C. SMELTZER
BY Arthur Freilich
ATTORNEY United States Patent Office 3,341,817

Patented Sept. 12, 1967

3,341,817
MEMORY TRANSFER APPARATUS

Jack C. Smeltzer, Woodland Hills, Calif., assignor to The Bunker-Ramo Corporation, Canoga Park, Calif., a corporation of Maryland Filed June 12, 1964, Ser. No. 374,640
7 Claims. (Cl. 340—172.5)

This invention relates generally to data processing apparatus and more particularly to means for use in such apparatus for transferring information between different memories thereof.

Many data processing systems and digital computers employ a hierarchy of memories in order to optimize storage capacity, access time, and cost factors. Actually, the final design of any system necessarily represents a compromise of these factors inasmuch as the choice of a larger capacity and a shorter access time are each reflected by an increase in cost. Utilization of a hierarchy of memories often provides an optimum compromise since the large storage capacity can be provided in an inexpensive form and the rapid access can be provided by a random access memory which has a small capacity and which is thus not very expensive.

When a hierarchy of memories is employed, means of course must be provided for transferring information from one memory to another. The information commonly stored in the slower, high capacity memory includes data and programs not currently being operated upon, while the information stored in the rapid access memory of course comprises the active program and the data required thereby. If significant advantage is to be gained from the use of the rapid access memory, rapid and effective means must be provided for transferring information between memories.

Various techniques are used in prior art systems for transferring information between a cyclic memory (e.g., a magnetic drum) and a rapid random access memory (e.g., a magnetic core memory). One such technique permits transfers to be initiated at either a fixed location in memory or a specific sector on the drum or at locations and sectors designated by the computer, but which, in either event, are independent of the location of the drum at the time the transfer is requested. Thus, a time delay equal to one-half of a drum revolution on the average is introduced between the time the transfer is requested and the time at which information transfer is actually initiated.

In view of the disadvantages of prior art techniques for transferring information between memories, it is an object of the present invention to provide means for more rapidly and more simply transferring information between memories employed in a data processing system.

Any data processing system is usually called upon to execute a multitude of different programs. Each program actually consists of a series of instructions which identify memory locations and operations to be performed on data stored in those locations. As noted, where a hierarchy of memories are employed, inactive programs are usually stored in the large capacity, low cost memory while the programs actually in use or about to be used are stored in the small rapid access memory. Several programs of course are likely to be written requiring the same space in the rapid access memory. Inasmuch as it is often not possible in certain system applications, particularly those being used on line, to predict the sequence in which programs are to be executed, more than one program may be found to be competing for a given portion of the rapid access memory. Since it is uneconomical to wait for one program to be completely executed prior to bringing a new program into the rapid access memory, it is desirable to provide some technique for avoiding this competition among programs.

Consequently, it is an additional object of the present invention to provide means in a data processing system for selectively modifying programs in the course of being transferred between memories in such a way that the programs can be properly executed from any space in the rapid access memory.

Briefly, in accordance with one aspect of the invention, an immediate transfer of information between a cyclic memory and a random access memory can be effected by using the address of the information about to be read from the cyclic memory to define a location in the rapid access memory into which the information is written. In accordance with a further aspect of the invention, selectively actuatable means are provided for modifying each instruction in a program in the course of transferring it between memories. For example, a constant number can be added to or subtracted from the operand address field of each instruction in a program to thereby permit the program to be executed from a different section of the rapid access memory than was originally intended.

The novel features that are considered characteristic of this invention are set forth with particularity in the appended claims. The invention itself, both as to its organization and method of operation, as well as additional objects and advantages thereof, will best be understood from the following description when read in connection with the accompanying drawing which illustrates a logical block diagram of a preferred embodiment of the present invention.

Attention is now called to the figure which comprises a block diagram of a portion of a data processing system. The system employs a hierarchy of memories including a cyclic memory 10, which can for example be of the magnetic drum type, and a random access memory 12, which can for example be of the conventional magnetic core type. A drum type memory usually provides a very large storage capacity which is relatively inexpensive per information unit stored. It will henceforth be assumed that an information unit comprises a binary digit or bit. On the other hand, the core memory 12 is relatively expensive on a per bit basis. The redeeming characteristic of the core memory of course is that storage locations can be accessed much more rapidly than locations or sectors in the drum memory, inasmuch as all of the locations in the core memory are randomly and immediately accessible whereas locations in the drum memory are sequentially accessible. That is, a drum memory location can be accessed only when it moves under the magnetic transducers or heads positioned adjacent the periphery of the drum. In order to optimize speed, capacity, and cost factors, many data processing systems use a hierarchy of memories in which most of the information stored in the system is at all times held in the large, inexpensive memory and only the information actually being employed or about to be employed is held in the fast memory. Thus, the more expensive core memory can be considerably smaller than would otherwise be necessary if it were relied upon to hold all of the information in the system.

The information stored in the memories of any data processing system can usually be classified as either being control information or data information. The control information is contained in programs which usually consist of a plurality of instruction words which specify other instruction words or data words and operations to be performed thereon. The term "word" is usually used to imply a group of bits which are stored together in a single memory location and which are operated upon together. Different data processing systems employ words of different lengths which are chosen generally on the basis of the anticipated applications of the system. It will arbitrarily be assumed herein that the system illustrated in the figure employs a word length of 28 bits.

The word length can be arbitrarily divided into fields which can be used in different manners. Thus, in Table I below, a typical instruction word is illustrated as being comprised of at least three fields. That is, bit positions 1 through 14 of the instruction word comprise the operand field and are used to store the memory address of a location storing a word to be operated upon. Bit position 15 constitutes the relativization field and is used, as will be more readily understood hereinafter, to indicate whether or not words being transferred between the memories 10 and 12 should be modified. Bit positions 16 through 28 comprise the operation field and are used to store information identifying the operation to be performed on the contents of the location identified by the operand field.

TABLE I

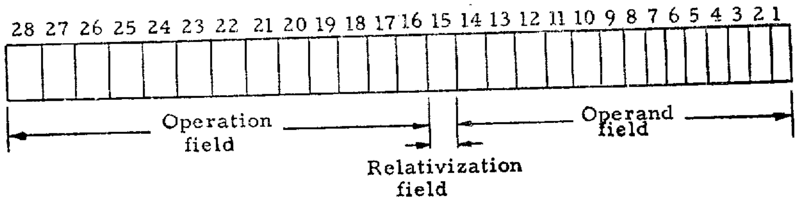

The drum memory 10 includes a plurality of tracks amongst which are a clock track, a sector address track, and a plurality of data tracks. Each track extends around the periphery of the drum, and is divided into a plurality of sectors which, for the sake of simplicity, will be assumed to be one hundred sectors. Each of the one hundred sectors in the sector address track will be assumed to store a different number which constitutes the address of that sector. Thus, the successive sectors in the sector address track will store numbers 1 through 100. The clock track has recorded therein clock pulses which are used to synchronize the operation of the data processing system. It will be assumed that 32 pulses are recorded in each sector of the clock track, each of the first 28 pulses being aligned with and defining a different bit position in the corresponding sector on the other drum tracks and the additional four pulses comprising space pulses.

Associated with each of the drum tracks is a readout head 14 which is responsive to the information recorded on the associated track to develop output signals representative thereof. The drum memory 10 includes in addition to the recording drum, a drum address register 16 which includes a track address portion and a sector address portion. Information stored in the track address portion of the register 16 is coupled to a decoding circuit 18 which in turn is provided with a plurality of output lines, each of which is associated with a different one of the drum data tracks. Each of the decoding circuit output terminals is connected to the input of a different AND gate 20. A second input to each of the AND gates 20 is derived from a different one of the data track readout heads 14.

The output of the sector address portion of register 16 is connected to the input of a compare circuit 22 along with the output line connected to the readout head 14 associated with the sector address track. When identical information is provided on the two inputs to the compare circuit 22, the compare circuit 22 will provide a logically true signal on its output terminal which is connected to the input of an AND gate 24. The output of the AND gate 24 is connected to the input of an OR gate 26 whose output in turn is connected to the input of AND gate 27. The output of gate 27 is connected to the set input terminal of a flip-flop FF1. The true output terminal of the flip-flop FF1 is connected to the input of all of the gates 20. Thus, when the flip-flop FF1 is true, the AND gate 20 identified by the information in the track address portion of the register 16 will be enabled to thus permit the signals developed by the associated readout head 14 to be applied to the input of an OR gate 28. The outputs of all of the gates 20 are connected in common to the input of OR gate 28. The output of OR gate 28 is connected to the input of a data register 30. Inasmuch as the cyclic memory in the data processing system illustrated has been assumed to be of the drum type, and since digits are normally read in serial fashion therefrom, the data register 30 will be assumed to be a shift register with the digits being entered into the most significant stage thereof and being shifted down to the least significant stage.

The readout head 14 coupled to the clock track 10 is connected to the input of a scale-of-thirty-two counter 32. The counter 32 is provided with thirty-two output terminals each of which defines a different digit time. It will be recalled that the first 28 positions in each sector can store bits while the last four positions are space bits. Thus, after digit time *dt*28 during each sector or word time in which information is being read from the drum, an entire word will be stored in the data shift register. The succeeding four digit times can be used to effect parallel transfers from the data shift register 30.

Prior to proceeding with a further discussion of the drum memory 10, reference is made to the core memory 12 which, in addition to a core storage matrix 34, includes a data register 36, an address register 38, and a memory control means 40. The address register 38 is divided into two portions respectively comprising a block address portion and a location address portion. The core storage matrix 34 can be considered as being functionally divided into a plurality of blocks, each block including the same number of locations as are included in a drum data track (herein assumed to be one hundred). It should of course be appreciated, from what has been said thus far regarding the philosophy of utilizing a hierarchy of memories in a system, that the number of data tracks on the drum is significantly greater than the number of blocks in the matrix 34.

The detailed operation of a core memory 12 is well documented in the prior art and will not be considered in detail here. Generally, the memory control means 40 in response to appropriate timing means, provides signals determining whether information is to be written into or read from the location in the matrix 34 identified by the information stored in the address register 38. If a write operation is defined by the memory control means 40, then the data stored in the registeer 36 is written into the location defined by the information in the address register 38. On the other hand, if a read operation is defined by the memory control means 40, then the contents of the location identified by the information in the address register 38 is entered into the data register 36.

Information transfer between the drum memory 10 and the core memory 12 is initiated in response to an appropriate command entered into an instruction register 42. Two different transfer modes will be considered herein; namely, a normal transfer mode and an immediate transfer mode. A further operational mode, namely a relativization mode which is appropriately used with either of the transfer modes, will also be considered. The means for entering the appropriate commands into the register 42 will not be specifically considered herein inasmuch as the prior art is well documented with respect to performing inter-register transfers within a data processing system for entering commands into an instruction register. In addition, the means for initializing each of the registers 16, 38, and a counter register 44 to be referred to hereinafter, will not be specifically considered. The initial conditions which should be defined in each of these registers in order to execute the transfer and operational modes will however be discussed.

The output of the instruction register 42 is connected to the input of a decoding circuit 45 which is illustrated as having three output terminals 46, 48, and 50 to which logical true signals are respectively applied in response to immediate transfer, normal transfer, and relativization commands stored in the instruction register 42. In the performance of a normal transfer of information from the drum memory 10 to the core memory 12, a starting address (both track address and sector address) is initially entered into the drum address register 16. In addition, a starting address (both block address and location address) is entered into the address register 38. Further, a number is entered into the counter register 44 which indicates the number of words intended to be transferred from the drum memory 10 to the core memory 12.

The normal transfer output terminal 48 of the decoding circuit 45 is connected to the input of the AND gate 24. The compare circuit 22 functions to compare the starting sector address stored in the sector address portion of the drum address register 16 with the sector address read from the sector address track. When identity is recognized, the flip-flop FF1 is set at digit time *dt*30 through the gates 24, 26 and 27, so as to initiate transfer of the information, from the track identified by the address in the track address portion of the register 16, into the data shift register. The output of each of the stages of the data shift register 30 is connected to the input of a different AND gate 52. Although only one AND gate 52 is illustrated, actually one such gate must be provided for each stage of the data shift register 30 in order to permit parallel information transfer between the register 30 and the data register 36 of the core memory 12. The digit time *dt*30 output terminal of the counter 32 is connected to the input of all of the gates 52 to thereby transfer in parallel all of the information in register 30 into register 36. The memory control means 40 causes the information transferred into the data register 36 to be written into the starting location identified by the information stored in the register 38. After each word is written into the core memory 12, it is necessary to increment the information in the location address portion of the register 38 so that the subsequent word entered into the data shift register 30 will be written into a subsequent location in the core memory 12. In addition, it is necessary to decrement the number in the counter register 44 so as to indicate that fewer words remain to be transferred.

The incrementing of the location address portion of the address register 38 is accomplished by providing a parallel adder 54 whose input is derived through an AND gate 56 from the location address portion of the register 38. The output of the parallel adder is connected back into the input of the location address portion of the register 38. The inputs to the AND gate 56 comprise the true output terminal of the flip-flop FF1, the digit time *dt*30 output terminal of the counter 32, and the output of the location address portion of the address register 38. Thus, at each digit time *dt*30 when the flip-flop FF1 is true, the contents of the location address portion of the register 38 will be incremented. It should of course be apparent that the flip-flop FF1 will be true only so long as words are being read from the drum memory into the register 30.

Also connected to the output of the parallel adder 54 is the input of a decoding circuit 58 which is responsive to the recognition of the ultimate word in a block. Thus, when the location address portion of the address register 38 stores the equivalent of 99, decoding circuit 58 will provide a true signal to the input of an AND gate 60. The normal transfer output terminal 48 is also connected to the input of AND gate 60 whose output is connected to the input of an OR gate 62. The output of OR gate 62 is connected to the input of an AND gate 64. Similarly to the AND gate 56, the digit time *dt*30 terminal of counter 32 is connected to the input of AND gate 64 along with the true output terminal of flip-flop FF1. The output of the block address portion of the register 38 is also connected to the input of AND gate 64 whose output is connected to the input of a parallel adder 66. The output of the parallel adder 66 is connected back into the input of the block address portion of the register 38. Thus, when the system is operating in a normal transfer mode, the block address portion of the address register 38 will be incremented when the address register 38 defines the ultimate location in a block.

Decrementing of the counter register 44 is accomplished in virtually the same manner as the incrementing of the portions of the address register 38. Thus, the output of the least significant portion of the counter register 44 (which portion can store the equivalent of one hundred different decimal numbers) is connected to the input of AND gate 70 whose output is connected to the input of a parallel adder 72, whose output is connected back to the input of the least significant portion of the register 44. The true output terminal of flip-flop FF1 and the digit time *dt*30 ouput terminal of the counter 32 are also connected to the input of AND gate 70. The most significant portion of the register 44 is similarly decremented when a decoding circuit 74 indicates that the count in the least significant portion of the register 44 is 00.

In addition to incrementing the address specified in the address register 38 of the core memory 12, the information in the track address portion of the drum address register 16 must be incremented when the last sector of a track is reached if transferring is to continue as indicated by the number stored in the counter register 44. When transferring is to be terminated, counter register 44 will store an all "0's" code which will be recognized by decoding circuits 74 and 75 which in turn will cause an AND gate 76 to provide a true terminate output signal. The output of gate 76 is connected to the reset input terminal of flip-flop FF1. Thus, when gate 76 provides a true output signal, flip-flop FF1 will be reset thus inhibiting further transfer of information from the drum memory into the data shift register 30. Prior to termination, however, the track address portion of the register 16 must be incremented when the ultimate sector in a track is reached. The ultimate sector in each track is recognized by a decoding circuit 78 whose input is connected to the output of the head associated with the sector address track. The output terminal of circuit 78, which is made true in response to the ultimate sector being recognized, is connected to the input of an AND gate 80 along with the normal transfer output terminal 48. The output of AND gate 80 is connected to the input of an OR gate 82 whose output is connected to the input of an AND gate 84. In addition, the digit time *dt*30 output terminal of counter 32 and the output of the track address portion of the drum address register 16 are connected to the input of AND gate 84 whose output is connected to the input of an adder 86. The output of the adder 86 is connected back to the input of the address portion of the drum address register 16. Thus, when the system is operating in a normal transfer mode, the data tracks will be successively read for so long as transferring from the drum memory 10 to the core memory 12 is to be continued as determined by the number in the counter register 44.

From what has been said thus far of the normal transfer operation, it should be appreciaed that on the average, actual information transfer will not be initiated until after one half of a drum revolution delay after the instruction register, address registers, and counter register have been initialized. The delay is of course introduced because when a starting address on the drum is specified, transferring cannot take place until that specified location moves under the readout heads 14. Because this waiting time can represent a significant handicap in certain applications, as where the transfering is between two memories in a hierarchy of memories in a data processing system, means are provided for effecting an immediate transfer of information in response to an immediae transfer command entered into the instruction register 42. The immediate transfer output terminal 46 of the decording circuit 44 will be provided with a true signal in response to the immediate transfer command in the instruction register 42 and will in turn set the flip-flop FF1 through gates 26 and 27. This in turn will immediately initiate transfer from the data tracks to the data shift register 30. At the subsequent digit time *dt*30, the information in the register 30 will be transferred in parallel through AND gate 52 in to the data register 36 and thence written into the core memory matrix 34. The location into which the information is written is of course determined by the information stored in the address register 38.

In the immediate transfer operation, the track address portion of the drum address register 16 and the block address portion of the address register 38 are initialized but neither the sector address portion of the register 16 nor the location address portion of the register 38 is initialized. The location address is entered into the address register 38 at digit time *dt*29 through an AND gate 88. One input to the AND gate 88 is derived from the output of a sector shift register 90 whose input is derived from the readout head 14 associated with the sector address track. Thus, in the operation of the immediate transfer mode, transfering can begin immediately and no time is wasted in waiting for a specified sector on the drum to move into position. After the initial word is transferred from the drum memory 10 to the core memory 12, the information in the location address portion of the register 38 will be incremented as each word is transferred in the identical manner as was performed in the normal transfer mode. The incrementing of the block address portion of the address register is different in the immediate mode, however, inasmuch as it is not desired to increment the block address on the basis of the location address but, rather, only after a full block of information has been transferred. For example, assume that the initial word transferred was derived from sector 47 on one of the drum tracks and that the word was thus inserted into location 47 of the specified block. Inasmuch as it is desirable to enter sectors 1 through 46 in the appropriate locations of that same block in the core memory matrix 34, it is not desirable to increment the block address portion of the register 38 until all one hundred sectors have been transferred. The least signficant portion of the counter register 44 can be utilized to indicate when all one hundred sectors have been transferred if the system in the immediate transfer mode is restricted to transferring whole blocks of information. Thus, assuming that five full blocks of information are desired to be transferred, the counter register 44 can be initialized by inserting the number 5 in the most significant portion thereof and the number 00 in the least significant portion thereof. When one hundred full words have been transferred, the decoding circuit 74 will provide a true output signal which will in turn cause an AND gate 92 to provide a true output signal to thus enable OR gate 62 and increment the block address in the register 38. It of course should be appreciated that at this same time, it is desirable to increment the track address stored in the track address portion of the register 16. This is accomplished by connecting the output of a gate 94, whose inputs are idenitcal to the inputs to gate 92, to the input of OR gate 82. The immediate transfer mode is terminated in the same manner as the normal transfer mode. That is, the operation is terminated by AND gate 76 providing a terminate signal which is employed to reset the flip-flop FF1.

From what has been said thus far, it should be appreciated that the immediate transfer mode, although somewhat restricted in the manner in which information can be transferred and to the locations into which the information can be entered, can be accomplished considerably faster than the normal transfer mode and thus can be extremely valuable in certain applications.

As previously noted, a hierarchy of memories in a data processing system is often employed so as to permit a plurality of different programs to be stored in the system and yet not have to pay an excessively high price for storing these programs. Thus, the hierarachy of memories is usally operated so that the active program or program about to be executed is stored in the fast or core memory and all other programs are stored in the larger less expensive memory. Programs, of course, consist of a sequence of instructions which instructions include operand addresses which identify locations in the core memory storing words upon which operations are to be performed. In certain applications, it is nearly impossible to know the sequence in which the programs will at all times be executed and thus situations may be encountered in which programs are effectively competing for specific locations in the core memory 12. More particularly, unless a program is executed from the portion of the memory for which it was originally written, the operand addresses in the instruction words forming the program could be incorrect so that execution of the program is meaningless. In order to avoid this situation from arising, the operand addresses of all of the words in the program could be appropriately modified in order to permit the program to be executed properly. By appropriately modifying the operand addresses, any program could be properly executed from any portion of the core memory. Modification of the operand addresses can be accomplished by adding or subtracting a relativization factor to each instruction word in the course of transferring it from the memory 10 to the memory 12.

Any transfer command in the instruction register 42 can also specify a relativization operation. In this event, the relativization output terminal 50 is set true. Initialization for the relativization operation requires entering a relativization factor in a shift register 100. The output of the shift register 100 is connected to the input of an AND gate 102 along with the relativization output terminal 50. AND gate 102 is enabled during digit times 15 through 28, assuming that the operand field in each instruction word is contained in bit positions 1 through 14. The output of the AND gate 102 is applied to the first input of a serial adder circuit 104. The second input to the adder circuit 104 is derived from stage 15 of the data shift register 30. The output of the adder circiut 104 is connected to the input of stage 14 of the data shift register 30. Thus, when a relativization operation is specified by the command in the instruction register 42, the relativization factor stored in the register 100 will be added to the operand field of the instruction word being loaded into the register 30, as the operand field is being shifted into bits 1 through 14 of the data shift register.

In any program, it is likely that many instruction words need not and should not be modified by a relativization factor inasmuch as they do not contain information which is affected by their position in the core memory 12. Thus, it is desirable to provide a bit in each word in a program which can override the relativization operation. Assume this bit is stored in position 15 of the word being transferred and further assume that when it is a binary "0," the relativization operation should be inhibited for that word. In order to introduce this feature, a flip-flop FF2 is provided whose true output terminal is connected to the input of AND gate 102. Connected to the set input terminal of flip-flop FF2 is the output of an AND gate 106, one of whose inputs is derived from the output of OR gate 28. The output of an AND gate 108 is connected to the reset input terminal of flip-flop FF2. One input terminal to the AND gate 108 is derived from an inverter 110 connected to the output of OR gate 28. Both AND gates 106 and 108 are enabled at digit time *dt*15. Thus, is a binary "0" exists in bit position 15 of any word being transferred when a relativization operation is specified, flip-flop FF2 will be switched to a false state thereby inhibiting further application of the relativization factor to the adder 104. In order to prevent any addition occurring at digit time *dt*15 prior to flip-flop FF2 switching false, the output of AND gate 108 is connected through an inverter 112 to the input of AND gate 102. Thus, at digit time *dt*15, when flip-flop FF2 is being set false to prevent future addition of the relativization factor to the operand field, the output of AND gate 112 will prevent such addition during digit time *dt*15.

From the foregoing, it should be appreciated that a method and apparatus has been disclosed herein for more efficiently transferring information between memories in a data processing system. A first significant aspect of the invention involves immediately transferring information from a cyclic memory to a random access memory without waiting for a defined cyclic memory location to come into reading position. A second extremely significant aspect of the invention involves the provision of apparatus for enabling instruction words in a program to be modified in the course of being transferred between the cyclic and random access memory to thereby permit any of the programs to be properly executed from any portion of the random access memory. Although only the means for transferring information from the slow large memory to the small fast memory have been specifically illustrated, it should be appreciated that in an actual system it would be desirable to provide additional means for transferring information in the other direction. Thus, in response to an immediate transfer command, the available sector address would be transferred into the address register 38 and the contents of the identified core memory location would be read into the data register 36 and transferred in parallel to a shift register. From the shift register, the information would be serially entered into the drum memory.

What is claimed is:

1. In a data processing system including a first memory of the type in which the locations thereof are available in sequence for reading or writing and a second memory of the type in which the locations thereof can be randomly selected:

means for generating a command signal;

means responsive to said command signal for reading the information stored in the next available location in said first memory;

means for developing address signals identifying the next available location in said first memory from which said information is read;

means responsive to said address signals for identifying a location in said second memory; and means for storing said read information in said location identified in said second memory.

2. The system of claim 1 including selectively operable means for modifying said read information prior to storing it in said second memory.

3. In a data processing system including a cyclic memory having a plurality of tracks, each track including a plurality of sequentially accessible sectors, and a random access memory including a plurality of location blocks, each block including a plurality of locations:

means for generating a command signal;

means for identifying one of said plurality of tracks;

means for identifying one of said plurality of blocks;

means responsive to said command signal for reading the contents of the next accessible sector in said identified track;

means for developing address signals identifying said next accessible sector;

means responsive to said address signals for identifying a unique location in said identified block; and means for storing said read contents in said unique location.

4. A data processing system comprising:

a cyclic memory having a plurality of tracks, each track including a plurality of sequentially accessible sectors;

said cyclic memory further including a sector address track, a track selection register, and an information register;

a random access memory having a plurality of location blocks, each block including a plurality of locations;

said random access memory further including an information register and an address register including a block address portion and a location address portion;

means for generating a command signal;

means for storing signals in said track selection register identifying one of said plurality of tracks;

means for storing signals in said block address portion of said address register for identifying one of said plurality of blocks;

means responsive to said command signal for reading the contents of the next accessible sector in said identified track;

means for developing address signals identifying said next accessible track;

means for storing said address signals in said location address portion of said address register; and means for storing said read contents in the block and location identified by said signals stored in said address register.

5. The data processing system of claim 4 including:

a counter;

means for storing a number in said counter representing the number of words to be transferred from said cyclic memory to said random access memory; and means responsive to said contents being stored in said second memory for incrementing said location address portion of said address register.

6. In a data processing system including a first memory storing a plurality of programs, each program being comprised of a plurality of instructions, and a second memory capable of storing a portion of said plurality of programs, apparatus for transferring a selected program from said first to said second memory, said apparatus including means for selectively modifying each of said programs so as to permit each of said programs to be executed from any portion of said second memory;

said means for modifying including a relativization register;

means storing a selected factor in said relativization register; and means for selectively combining said factor with each of said instructions in said selected program.

7. The system of claim 6 wherein said means for combining includes an adder circuit having input and output means;

means for coupling said first memory and said relativization register to said adder circuit input means; and means for coupling said adder circuit output means to said second memory.

References Cited

UNITED STATES PATENTS 3,208,048 9/1965 Kilburn et al. ______ 340—172.5

ROBERT C. BAILEY, *Primary Examiner.*

G. D. SHAW, *Assistant Examiner.*